US006567840B1

(12) United States Patent
Binns et al.

(10) Patent No.: US 6,567,840 B1
(45) Date of Patent: May 20, 2003

(54) TASK SCHEDULING AND MESSAGE PASSING

(75) Inventors: Pamela A. Binns, St. Paul, MN (US); Stephen C. Vestal, St. Paul, MN (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 09/312,592

(22) Filed: May 14, 1999

(51) Int. Cl.[7] .................................................. G06F 9/00

(52) U.S. Cl. ...................... 709/103; 709/100; 709/102; 709/107

(58) Field of Search ................................ 709/100, 101, 709/102, 103, 104, 105, 106, 107, 108

(56) References Cited

U.S. PATENT DOCUMENTS

| | | | |
|---|---|---|---|
| 3,648,253 A | 3/1972 | Mullery et al. | 360/172.5 |
| 5,408,663 A | 4/1995 | Miller | 395/650 |
| 5,560,032 A | 9/1996 | Nguyen et al. | 395/800 |
| 5,566,177 A | 10/1996 | Bhandari et al. | 370/85.5 |
| 5,630,096 A | 5/1997 | Zuravleff et al. | 395/481 |

OTHER PUBLICATIONS

Hiroyuki Kaneko, John A. Stankovic: "Integrated Scheduling of Multimedia And Hard Real–Time Tasks", Proceedings of the IEEE Real–Time Systems Symposiums, US, New York, IEEE, vol. Symp. 17, Dec. 4, 1996, pp. 206–217, XP000659642, ISBN: 0–7803–3801–4, p. 206, Left–Hand Column, Line 1–p. 207, Left–Hand Column, Last Line p. 209, Left–Hand Column, Line 15, Right–Hand Column, Line 47.

Steve Vespal: "Metah Support for Real–Time Multi–Processor Avionics" Proceedings of $5^{th}$ Intl. Workshop on Parallel and Distributed Real–Time Systems and $3^{rd}$ Workshop on object–oriented real–time systems. Apr. 1–3 1997, pp. 11–23, XP002153417, Geneva, Switzerland, The whoe document.

Sara R. Biyabani, John A. Stankovic, Krithi Ramamritham: "The Integration of Deadline and Criticalness in Hard Real–Time Scheduling" Proceedings of the the Real Time Systems Symposium, US, Washington, IEEE Comp. Soc. Press, vol. Symp 9, Dec. 6. 1988, pp. XP000014046, The Whole Document.

Binns, P., et al., "Precedence Constrained Fixed Priority Scheduling with Solutions to Some Pratical Problems", Honeywell Technology Center; Submitted to RTSS '99, (1999).

Chetto, M., et al., "A feasibility test for scheduling tasks in a distributed hard real–time system.", *APII, vol. 24*, Copyright AFCET 1990, 239–252, (1990).

Johnson, M., "Boeing 777 Airplane Management System— Philosophy and Displays", Honeywell, Inc. Air Transport Systems, Phoenix, Arizona, USA, 8.

(List continued on next page.)

*Primary Examiner*—Majid Banankhah

(57) ABSTRACT

Methods for modeling real-time periodic and aperiodic task scheduling and message passing within multitask systems. The methods utilize undelayed and single sample delayed message connections among software task objects and hardware objects. Task priorities are assigned inversely with period or deadline, so that tasks with shorter periods or deadlines have higher scheduling priorities. Periods of high-criticality tasks are decomposed into smaller pieces that are sequentially dispatched at higher rates where the initial assignment of priority is inconsistent with task criticality. The methods provide for deterministic communication among periodic processes.

15 Claims, 11 Drawing Sheets

OTHER PUBLICATIONS

Lehoczky, J.P., "Fixed Priority Scheduling of Periodic Task Sets with Arbitarary Deadlines", *IEEE*, 201–209, (1990).

Sprunt, B., et al., "Exploiting Unused Periodic Time for Aperiodic Service Using the Extended Priority Exchange Algorithm", *IEEE*, 251–258, (1988).

Audsley, N. C., et al., "Fixed Priority Pre–emptive Scheduling: An Historical Perspective", *Real–Time Systems, 8*, 1995 Kluwer Academic Publishers, Boston, 173–198, (1995).

Bettati, R., et al., "End–to–End Scheduling to Meet Deadlines in Distributed Systems", *Proceedings of the 12th International Conference on Distributed Computing Systems*, 452–459, (Jun. 1992).

Binns, P., "Incremental Rate Monotonic Scheduling for Improved Control System Performance", *Real–Time Applications Symposium*, 11 pgs., (Jun. 1997).

Binns, P., "Scheduling Slack in MetaH", *Real–Time Systems Symposium, Work in Progress Session*, 4 pgs., (Dec. 1996).

Gerber, R., et al., "Semantics–Based Compiler Transformations for Enhanced Schedulability", *IEEE*, 232–242, (1993).

Gertz, M.W., et al., "A Human–Machine Interface to Support Reconfigurable Software Assembly for Virtual Laboratories", *IEEE Robotics and Automation Magazine, 4*, 1–8, (Dec. 1994).

Gillies, D. W., et al., "Scheduling Tasks with and/or Precedence Constraints", *SIAM J. Comput., 24*, 1995 Society for Industrial and Applied Mathematics, 787–810, (Aug. 1995).

Garcia, J. J., et al., "Optimized Priority Assignment for Tasks and Messages in Distributed Hard Real–Time Systems", *IEEE*, 124–132, (1995).

Harbour, M. G., et al., "Fixed Priority Scheduling of Periodic Tasks with Varying Execution Priority", *IEEE*, 116–128, (1991).

Lehoczky, J., et al., "The Rate Monotonic Scheduling Algorithm: Exact Characterization and Average Case Behavior", *IEEE*, 166–171, (1989).

Lehoczky, J. P., et al., "An Optimal Algorithm for Scheduling Soft–Aperiodic Tasks in Fixed–Priority Preemptive Systems", *IEEE*, 110–123, (1992).

Leung, J. Y., et al., "On the Complexity of Fixed–Priority Scheduling of Periodic, Real–Time Tasks", *Performance Evaluation 2*, North–Holland Publishing Company, 237–250, (1982).

Liu, C. L., et al., "Scheduling Algorithms for Multiprogramming in a Hard–Real Time Environment", *Journal of the Association for Computing Machinery, 20*, 46–61, (Jan. 1973).

Luqi, "Real–Time Constraints in a Rapid Prototyping Language", *Computer Lang., 18*, 77–103, (1993).

McConnell, D. J., et al., "Reengineering a Single Threaded Embedded Missile Application Onto a Parallel Processing Platform Using MetaH", *IEEE, Proceedings of the 4th WPDRTS*, 57–64, (1996).

Mok, A. K., et al., "Synthesis of a Real–Time Message Processing System with Data–driven Timing Constraints", *IEEE*, 133–143, (1987).

Saksena, M., et al., "Design and Implementation of Maruti–II", *in Principles of Real–Time Systems, Sang Son Ed.*, Chapter 4, (1994).

Saksena, M., et al., "Guidelines for Automated Implementation of Executable Object Oriented Models for Real–Time Embedded Control Systems", *IEEE*, 240–251 (1997).

Sha, L., et al., "Priority Inheritance Protocols: An Approach to Real–Time Synchronization", *IEEE Transactions on Computers, 39*, 1175–1185, (Sep. 1990).

Sha, L., et al., "Solutions for Some Practical Problems in Prioritized Preemptive Scheduling", *IEEE*, 181–191, (1986).

Spuri, M., et al., "How to Integrate Precedance Constraints and Shared Resources in Real–Time Scheduling", *IEEE Transactions on Computers, 43*, 1407–1412, (Dec. 1994).

Stoyenko, A.D., et al., "A Schedulability Analyzer for Real–Time Euclid", *IEEE*, 218–227, (1987).

Sun, J., et al., "Synchronization Protocols in Distributed Real–Time Systems", *IEEE*, 38–45, (1996).

Vestal, S., "Fixed–Priority Sensitivity Analysis for Linear Compute Time Models", *IEEE Transactions on Software Engineering, 20*, 308–317, (Apr., 1994).

Vestal, S., "MetaH Support for Real–Time Multi–Processor Avionics", *Joint Workshop on Parallel and Distributed Real–Time Systems*, Geneva, Switzerland, 10 pgs., (Apr. 1997).

Vestal, S., "Mode Changes in a Real–Time Architecture Description Language", *Second International Workshop on Configurable Distributed Systems*, 11 pgs., (Mar. 1994).

Vestal, S., et al., "Scheduling and Communication in MetaH", *Proceedings of the Real–Time Systems Symposium*, Raleigh–Durham, NC, 7 pgs., (Dec. 1993).

Xu, J., et al., "Scheduling Processes with Release Times, Deadlines, Precedence, and Exclusion Relations", *IEEE Transactions on Software Engineering, 16*, 360–369, (Apr., 1994).

TASK SCHEDULING AND MESSAGE PASSING

The Government may have rights in this invention pursuant to Contract No. DAAH01-97-C-R233, awarded by the Department of the Army.

TECHNICAL FIELD

The present invention relates generally to task scheduling and message passing within task systems, and in particular to modeling real-time periodic and aperiodic task scheduling and message passing adapted to analyze the timing behavior within multitask systems and to define electronic systems and instructions for carrying out such scheduling and message passing.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. The following notice applies to the software and data as described below and in the drawings hereto: Copyright© 1999, Honeywell, Inc., All Rights Reserved.

BACKGROUND

Computer processes are often subdivided into a variety of functions which may be executed as tasks in serial and/or parallel fashion. These computer processes can be used to gather and act upon information, and to bring about some result in response to the information. These functional task systems find use in a variety of important environments. Examples may include monitor and control of an industrial process, such as a power generation and distribution system, or monitor and control of complex equipment, such as a commercial airliner.

Classical control functions rely on data flows between periodically executed tasks, with the results of a task delivered at the next dispatch of that task. This behavior allows cyclic data dependencies among tasks, i.e., feed-back loops, and is consistent with the assumptions underlying the mathematical analysis of discrete time dynamic systems. A message passing communication model is more suitable for partitioned multiprocessor systems than a shared memory communication model, especially systems that are loosely coupled to maintain a high degree of hardware fault isolation.

In many mission critical systems software needs to be modularized using an appropriate functional breakdown, which often requires decomposing a traditional control task into multiple communicating subtasks. This may require end-to-end ordering and scheduling of certain subtasks and messages. For example, in an avionics system, inertial measurement processing and autopiloting might be implemented as separate functions performed by separate task sets. There would be an end-to-end deadline from reading sensor data to outputting actuator commands, and task and message order dependencies within this deadline.

The increasing complexity of hardware makes it harder to accurately bound computation and communication times. Caches, for example, make it more difficult to accurately bound worst-case compute times, even for algorithms whose control flow is data-independent. Actual worst-case compute times may be substantially less than bounds that can be easily established during development. Actual compute times may vary significantly across different dispatches of the same task. Systems will be designed so that only the more critical functions are guaranteed with highest assurance to be schedulable under worst-case compute time bounds. Load shredding of the less critical tasks will occur during any intervals of transient processor overload.

High-assurance systems have additional requirements. The dependency ordering of computations and communications, and the exact times of interactions with the external world, must produce deterministic outcomes. Uncertainties or variations in task compute times must not affect the values of designated control outputs. It is necessary to formally model and analyze the timing behavior of a system. Specifications, models, analyses and code all need to be well-structured, understandable, traceable and amenable to multiple independent means of verification.

There is a need in the art for solutions in modeling real-time periodic and aperiodic task scheduling and message passing useful in integrated mission-critical systems, or in systems with high-rate applications and microcontrollers having constrained throughput and/or memory.

SUMMARY

The invention addresses deterministic communication between two periodic processes. It includes a communication model, a deadline reduction technique, a period transformation technique and implementation efficiency buffer assignment rules.

In one embodiment, the invention provides a method of generating an assigned scheduling priority of a plurality of tasks in a multitask system. The method includes defining a first list of the plurality of tasks, wherein the first list of the plurality of tasks is sorted with a task deadline as a primary key and a task criticality as a secondary key. The method further includes transforming the task deadline of each of the plurality of tasks that do not produce undelayed messages. The transformation occurs one at a time using a transformation scenario beginning with the task having the least task deadline, thereby producing a transformed task deadline for each of the plurality of tasks. The method still further includes defining a second list of the plurality of tasks, wherein the second list of the plurality of tasks is sorted with the transformed task deadline as the primary key and wherein each transformed task deadline of a task having a first task criticality is less than any transformed task deadline of a task having a task criticality less than the first task criticality. Scheduling priority is then assigned in the order of the second list of the plurality of tasks, thereby producing the assigned scheduling priority. In a further embodiment, the multitask system is a flight control system.

In another embodiment, the invention provides a method of operating a multitask system. The method includes communicating among tasks, with each task having a priority and a criticality. Each task is a sender and/or receiver of undelayed messages and/or single sample delay messages. The method further includes assigning a priority to each sender task sending undelayed messages such that the priority of the sender task is higher than the priority of any downstream receiver task. The method further includes assigning a priority to each sender task that does not send undelayed messages, where each such task having a first criticality has a priority greater than any such task having a criticality lower than the first criticality. The method still further includes executing each of the tasks on a processor according to their assigned priorities. In yet another embodiment, the multitask system is a flight control system.

In a further embodiment, the invention provides a multitask system. The multitask system includes a processor and a plurality of tasks operating on the processor. Each task is of a periodic or aperiodic task type. Each task has associated with it at least one I/O buffer. Communications with each I/O buffer is adapted to either undelayed messages or single sample delay messages. An executive task having a periodic dispatcher, an event handler and a service component is utilized for controlling dispatching of tasks and communications among the I/O buffers. The periodic dispatcher manages dispatching of periodic tasks and their single sample delay communications. The event handler manages dispatching of aperiodic tasks and their single sample delay message communications. The service component manages task completions and all undelayed message communications. In a still further embodiment, the multitask system is a flight control system.

DESCRIPTION OF THE EMBODIMENTS

In the following detailed description of the preferred embodiments, reference is made to the accompanying drawings which form a part hereof, and in which is shown by way of illustration specific embodiments in which the inventions may be practiced. These embodiments are described in sufficient detail to enable those skilled in the art to practice the invention, and it is to be understood that other embodiments may be utilized and that process or mechanical changes may be made without departing from the scope of the present invention. The following detailed description is, therefore, not to be taken in a limiting sense, and the scope of the present invention is defined only by the appended claims.

Figure 1A:
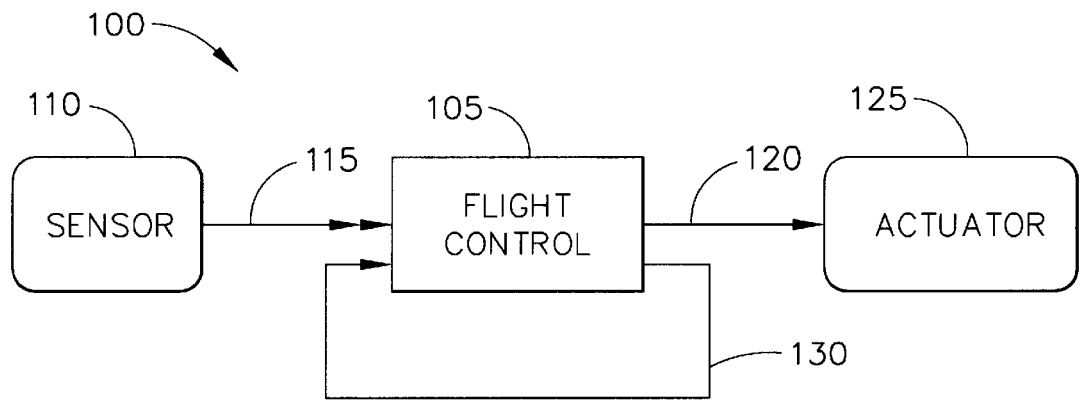
FIG. 1A is a schematic of a flight control system for use in accordance with an embodiment of the invention.

FIG. 1A is a schematic of a flight control system 100. Flight control task 105 is executed at some periodic rate. Flight control task 105 receives sensor data (S) 115 from sensor 110, computes a function $f$ with sensor data 115 and state data 130 computed in a previous dispatch ($X_m$) as inputs, and writes an output ($X_{m+1}$) 120 to an actuator 125. This may be written as $X_{m+1}=f(X_m, S)$. Sensor data 115 should be transferred substantially without delay to flight control task 105, and flight control task 105 must not start executing until it has received the sensor data 115. This undelayed transfer is represented with a double-headed arrow.

Actuator output 120 computed from sensor data 115 read at time t should be written at exactly t+$\Delta$ with minimal jitter, where $\Delta$ and the task period are determined and specified by a control engineer based on system requirements. Often, $\Delta$ is a deadline that occurs before the next dispatch of the flight control task. The state information ($X_m$) 130 computed at the $m^{th}$ dispatch of the task must be received at the $(m+1)^{th}$ dispatch of the task. This delayed data flow is represented by the feedback connection from the flight control task to itself. The feedback data from the flight control task to itself can also be transferred with some fixed and invariable delay, e.g., the period of that task. These latter two transfers are termed single sample delay (SSD) connections.

If data is sent from a periodic task A to a periodic task B (possibly having different rates), and if the $i^{th}$ dispatch of B receives data from the $j^{th}$ dispatch of A in any schedulable run, it must do so in every schedulable run to satisfy feedback control determinacy requirements. This is true for undelayed as well as SSD connections.

Figure 1B:
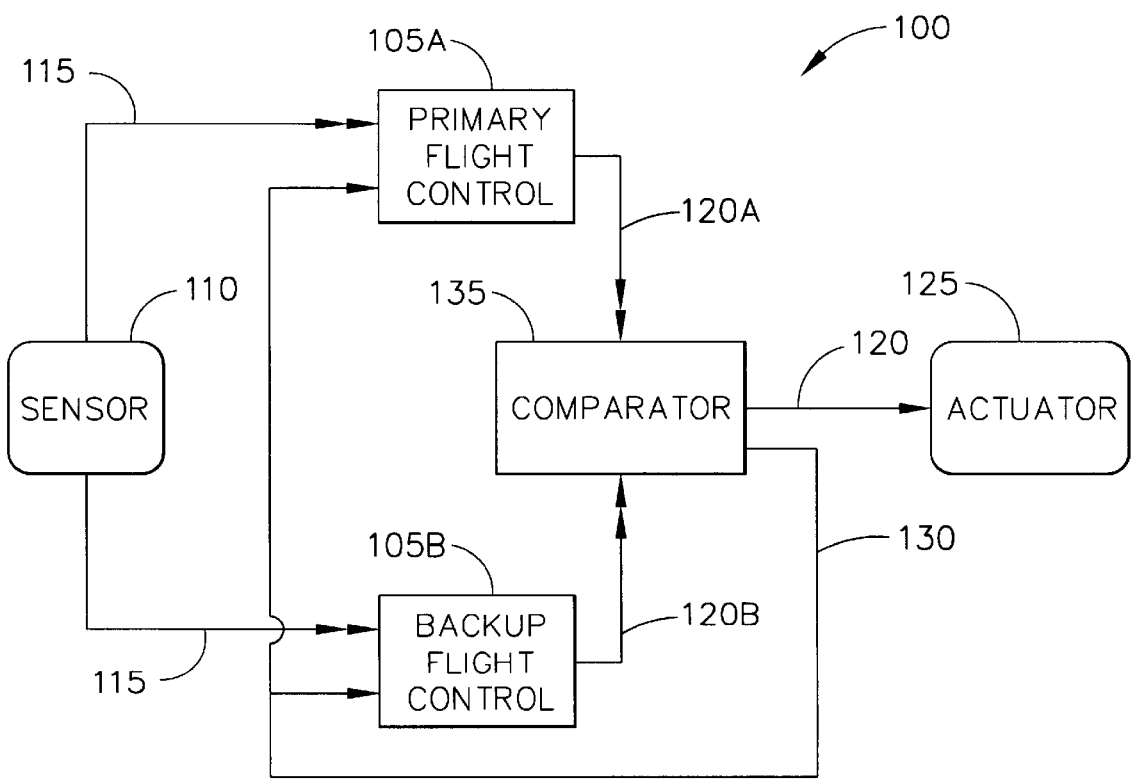
FIG. 1B is a schematic of a redundant flight control system for use in accordance with an embodiment of the invention.

FIG. 1B shows a variation of a flight control system 100 having redundancy. Flight control system 100 further includes a primary flight control task 105A, a secondary flight control task 105B and a comparator task 135 to select the output (120A or 120B) used to control the system. The end-to-end deadline $\Delta$ between reading the sensor input 115 and writing the actuator output 120 applies to the execution of all three tasks (105A, 105B and 135) and to the intermediate data transfer between the two flight control tasks 105A and 105B and the comparator task 135. The data transfer from the flight control tasks 105A and 105B to the comparator task 135 must be substantially undelayed, and a scheduling precedence constraint exists between the two flight control tasks 105A and 105B and the comparator task 135.

In one embodiment of the invention, the system provides preemptive fixed priority scheduling of periodic and aperiodic tasks and assignments between message buffer variables. Priorities are assigned inversely with period or deadline, so that tasks with shorter periods or deadlines have higher scheduling priorities. If the initial priority assignment is inconsistent with task criticalities then the periods and/or deadlines of high-criticality tasks are transformed, i.e., the tasks are decomposed into smaller pieces that are sequentially dispatched at higher rates. For aperiodic scheduling, the embodiment uses both deferrable server and period enforcement algorithms. In another embodiment, the system provides a real-time slack scheduler.

An exact characterization algorithm extended to provide sensitivity analysis information is utilized for schedulability analysis. The example embodiment has been implemented in a MetaH toolset that automatically generates and analyzes formal schedulability, reliability, and partitioning models of a system; and automatically composes the system, building images for each system processor, using generated scheduling and communication code. The MetaH toolset is developed and distributed by Honeywell, Inc., Minneapolis, Minn., USA. Other Computer-Aided Software Engineering (CASE) tools may be used with the various embodiments of the invention.

Figure 1C:
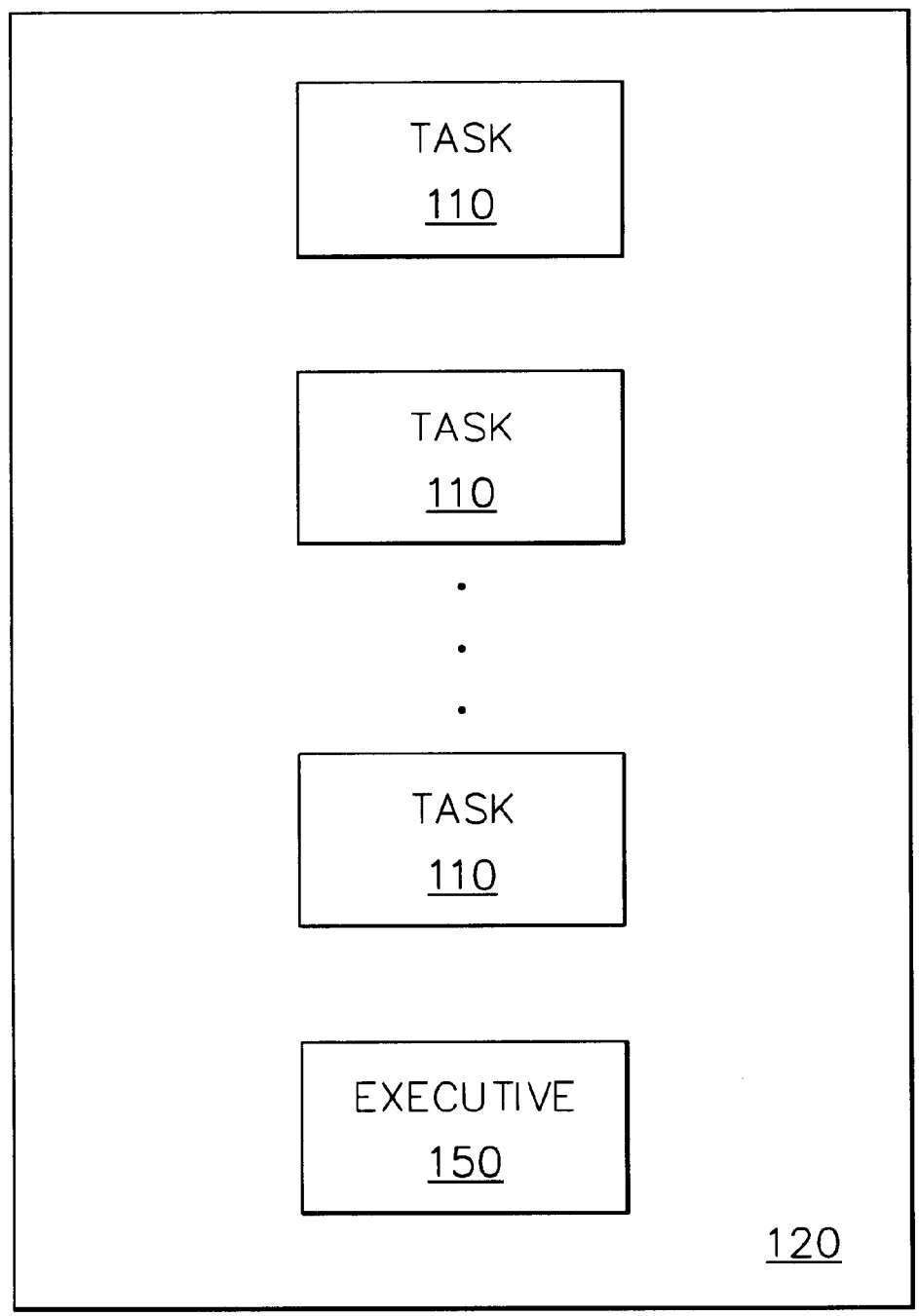
FIG. 1C is a block diagram of a multitask system in accordance with an embodiment of the invention.

With reference to FIG. 1C, task system 100 is a multitask system having at least two schedulable application tasks 110. The scheduling of application tasks 110 within task system 100, as well as the communications of application tasks 110, is controlled by an executive task 150. Each task 110 in the task system 100 is repeatedly dispatched, either at some fixed rate for periodic tasks or in response to some event, i.e., software-generated, interrupt or other event, for aperiodic tasks. A task 110 resides, or is performed by, only one processor 120.

Figure 2:
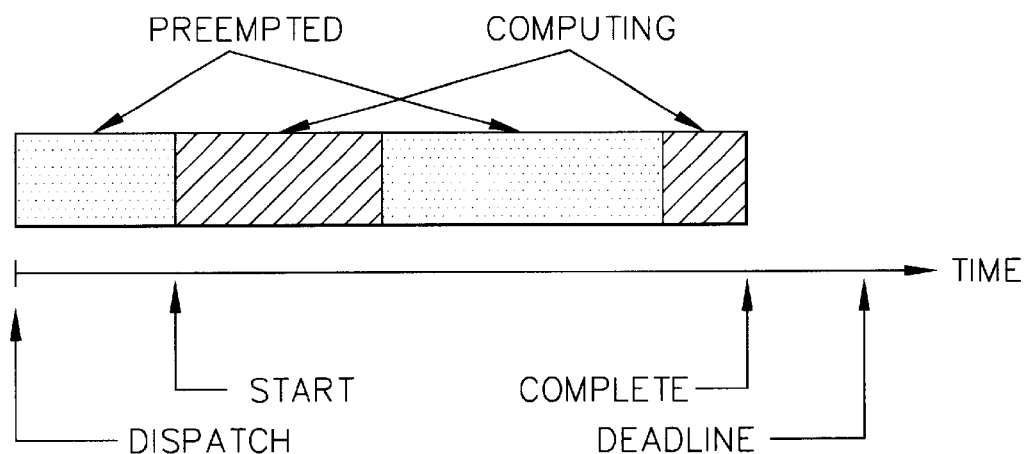
FIG. 2 is an execution timeline of a task in accordance with an embodiment of the invention.

FIG. 2 shows the task execution timeline of a task 110 following each dispatch and the terms defined herein for selected instants and intervals of time. The term "task instance" refers to a specific dispatch of a task 110 and the associated sequence of following activities and scheduling points. Between each dispatch of a task 110 and the following deadline, a task must perform a certain amount of work, receiving a certain amount of compute time from the processor. However, the processor may also spend some time working on other tasks 110 between dispatch and completion, during which intervals a task 110 is said to be preempted by other tasks 110. An important observation to make is that task dispatches, i.e., when a task 110 is placed in a prioritized ready queue, and deadlines, i.e., some system-defined deadline or other constraint for completion of the task, occur at deterministic times for periodic tasks. However, task start time, i.e., when computing of the task begins, and complete times, i.e., when computing of the task is complete, may vary depending on scheduling and compute time requirements.

Tasks 110 are characterized using four primary parameters. The class of a task is either periodic, i.e., regularly scheduled for dispatch, or aperiodic, i.e., dispatched in response to some non-scheduled event. The period of a task is the interval between dispatches of a periodic task, or the minimum interval between event arrivals for an aperiodic task. The compute time of a task is the upper bound on the amount of processor time required for an instance of that task to complete after each dispatch. In practice, the degree of assurance that the actual compute time will not exceed this value varies depending on the task.

The criticality of a task in one embodiment is an integer value used to control scheduling behavior when processors are overloaded, i.e., where some subset of tasks is unschedulable. While such a numerical ranking system is convenient for implementation, other ranking systems may be utilized. The schedulability of a task is affected only by tasks on the same processor having a criticality equal or greater to its own criticality. Lower criticality tasks may exceed their stated compute times, or, for aperiodic tasks, may be dispatched at a higher rate than their stated periods, without causing a higher criticality task to miss a deadline.

Figure 3:
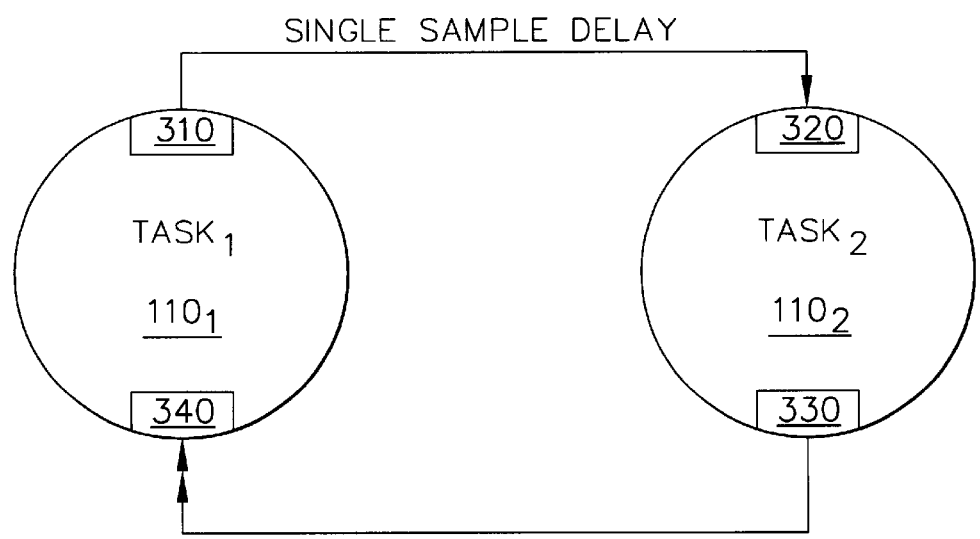
FIG. 3 is a schematic of connection types for message passing in accordance with an embodiment of the invention illustrated with task objects.

In one embodiment, messages are values that are transferred from output buffer variables in sender tasks to input buffer variables in receiver tasks according to a specified set of connections. In the MetaH specification language, each task may have one or more input or output ports that designate buffer variable declarations in the task source code, and connections can be made between compatibly typed ports as illustrated in FIG. 3. As depicted in FIG. 3, task $110_1$ has a single sample delay output buffer 310 and an undelayed input buffer 340. Task $110_2$ has a single sample delay input buffer 320 and an undelayed output buffer 330. Tasks $110_1$ and $110_2$ may have additional or other input and output buffers.

Single sample delay output buffer 310 provides its message value to single sample delay input buffer 320. Undelayed output buffer 330 provides its message value to undelayed input buffer 340.

Incoming messages are placed in the input buffers of a receiver task by the time it starts, and outgoing messages are presumed available in the output buffers of a task when it completes. In the absence of any other constraints on task scheduling in a schedulable system, incoming messages should be available at task dispatch, and outgoing messages may not be available until the task deadline. A task is a sender when sending a message value from its output buffer, and a receiver when receiving a message value at its input buffer.

In the example embodiment, there are two types of message connections. The first is a single sample delay connection. The second is an undelayed message connection.

A single sample delay connection causes the value received by a task instance to be the one available at the most recent sender deadline that preceded, or occurred at the same instant as, the receiver dispatch. In one embodiment, an exception occurs when the sender is an aperiodic task, such that the message value is obtained at the complete time rather than the deadline of the sender.

Figure 4:
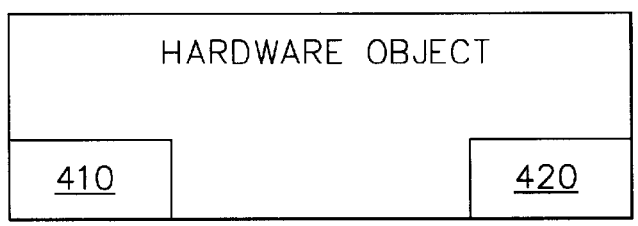
FIG. 4 is a schematic of a hardware object in accordance with an embodiment of the invention.

Hardware objects are allowed to have ports, e.g., device control registers mapped into memory space. As shown in FIG. 4, hardware object 400 may have one or more hardware input ports 410 and one or more hardware output ports 420. Transfers to or from hardware ports occur at the deadline of the sender task or dispatch of the receiver task instance, respectively. As noted above for aperiodic tasks, the transfers to a hardware port from an aperiodic task may occur at the task's complete time. Hardware objects provide message values to tasks, e.g., keyboard entry of data or data from a machine-readable medium, as well as accept message values from tasks, e.g., for display to an end-user or to control industrial equipment. Similar to tasks, a hardware object is a sender when sending a message value from its output port, and a receiver when receiving a message value at its input port.

Any task or device that outputs and does not input undelayed messages is termed a source. Any task or device that inputs and does not output undelayed messages is termed a sink. Any task or device that outputs undelayed messages is termed a producer. A source, by definition, is a producer. Any task or device that inputs undelayed messages is termed a consumer. A sink, by definition, is a consumer.

Figure 5:
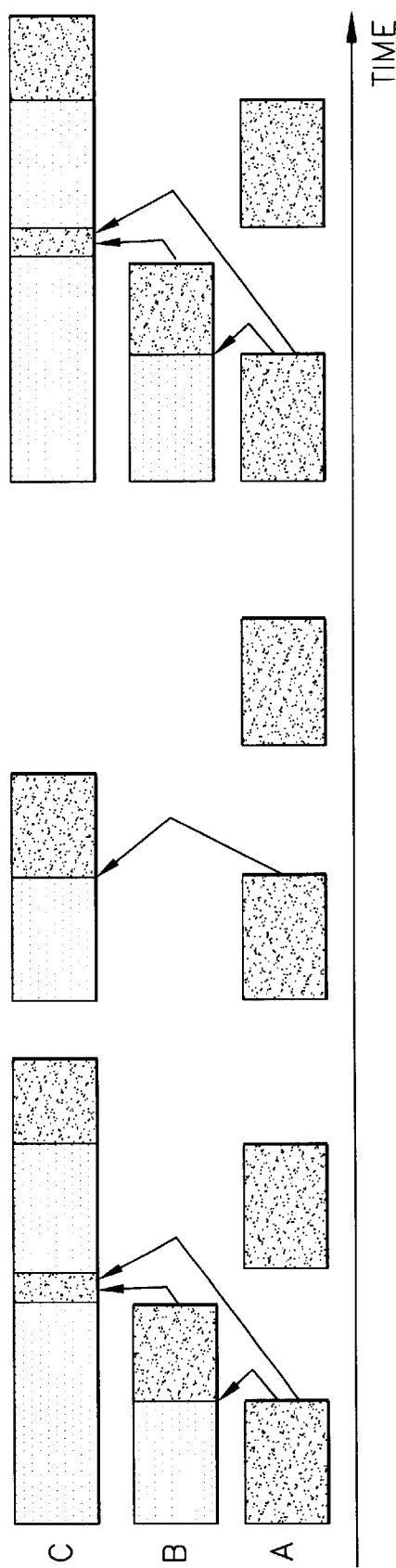
FIG. 5 is a schematic of end-to-end computations and communications in accordance with an embodiment of the invention.

Since deadlines and dispatches occur at deterministic times for periodic tasks, this results in a strictly deterministic data dependence among periodic tasks. That is, if the $j^{th}$ instance of a task receives data from the $i^{th}$ instance of another task in any schedulable run of the system, it will do so in all schedulable runs of the system. FIG. 5 shows an example of undelayed message passing between periodic tasks, where A has undelayed connections to B and C, and B has an undelayed connection to C. In FIG. 5, the $1^{st}$ instance of task C receives input from the 1$^{st}$ instances of tasks A and B, while the 2$^{nd}$ instance of task C receives input from the 3$^{rd}$ instance of task A and the 1$^{st}$ instance of task B. This dependency among periodic tasks with undelayed message passing will repeat in every schedulable run of the task system. The exception allowed in the case of an aperiodic sender is deemed an acceptable loss of determinism because aperiodic dispatch times are themselves non-deterministic in some sense, and this allows a simpler implementation.

An undelayed connection establishes a precedence constraint as well as a data dependency between task instances. The sender is executed to completion, the message is transferred, and then the receiver will be allowed to start. In one embodiment, task system 100 has the following constraints on undelayed message connections in what is termed the pairwise synchronous dispatch model.

1. The set of undelayed message connections and associated tasks must form a directed acyclic graph.
2. Every pair of periodic tasks that communicates by an undelayed connection must have harmonic periods, i.e., the period of one must be an integer multiple of the period of the other. Note that transitivity causes all tasks in an undelayed chain to be harmonic, but not in parallel branches of a tree. Consider, for example, parallel branches of undelayed chains A->>B->>$C_1$ and A->>B->>$C_2$, where the periods of A, B, $C_1$ and $C_2$ are 5 ms, 10 ms, 20 ms and 30 ms, respectively.
3. The sender of an undelayed message is allowed to have a lower criticality than the receiver only if the sender has enforced compute time and minimum event interarrival times.

An undelayed data transfer occurs between two periodic task instances only when they were dispatched at the same time, i.e., pairwise synchronous dispatch. in the pairwise synchronous dispatch model, the sender executes to completion first, and the receiver start is delayed until after the message is transferred. An overall end-to-end chain of computations and undelayed message communications has the deadline of the final receiver task. Referring again to FIG. 5, where A has undelayed connections to B and C, and B has an undelayed connection to C, note there is no requirement that senders have a higher dispatch rate than receivers. In the example of FIG. 5, C over samples the data received from B.

If either the sender or the receiver task is aperiodic, the ordering constraint and message transfer applies to the next instance of the receiver task that is dispatched at or following the dispatch of the sender task. This allows, for example, aperiodic tasks to pass data and dispatch successor aperiodic tasks to form trees of coordinating task instances.

If an undelayed connection comes from a hardware output port, the message value is transferred at the dispatch of the receiver task. If an undelayed connection goes to a hardware input port, the value is transferred at the completion of the sender task. Note that undelayed connections to hardware ports are not temporally deterministic. Accordingly, they may exhibit jitter due to compute time and scheduling variability.

Figure 6:
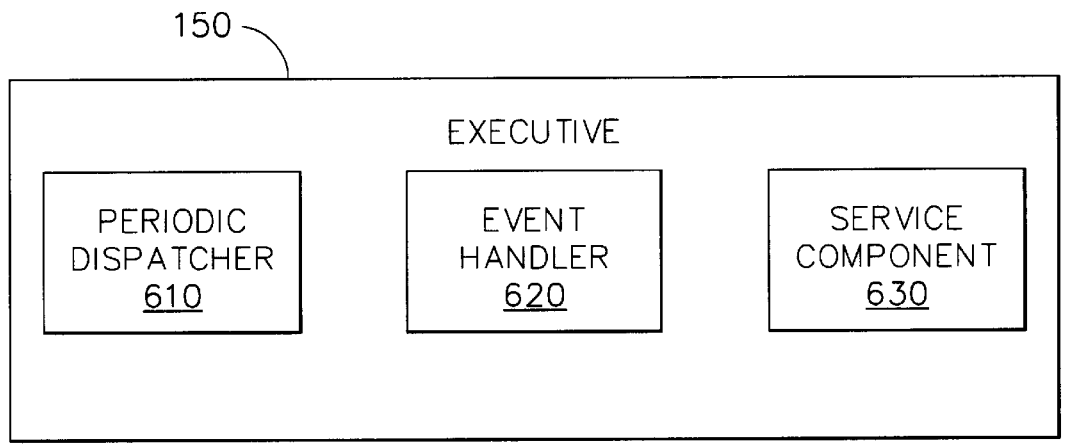
FIG. 6 is a schematic of a task executive in accordance with an embodiment of the invention.

In one embodiment, executive task 150 schedules tasks using a preemptive fixed priority discipline. Executive task 150 is responsible for managing task priorities, dispatching tasks (placing them on a prioritized ready queue), suspending tasks (removing them from the ready queue), and moving data between task buffer variables. Executive task 150, with reference to FIG. 6, includes three components:

1. a periodic dispatcher task 610 that is the highest priority task in the task system 100 and manages periodic dispatches of tasks 110 and their single sample delay communications,
2. an event handler 620 that manages aperiodic dispatches of tasks 110 and their single sample delay communications,
3. a service component 630 that manages task completions and all undelayed communications of tasks 110.

These three components may be automatically generated from a MetaH specification of tasks and their message and event connections.

Figure 7:
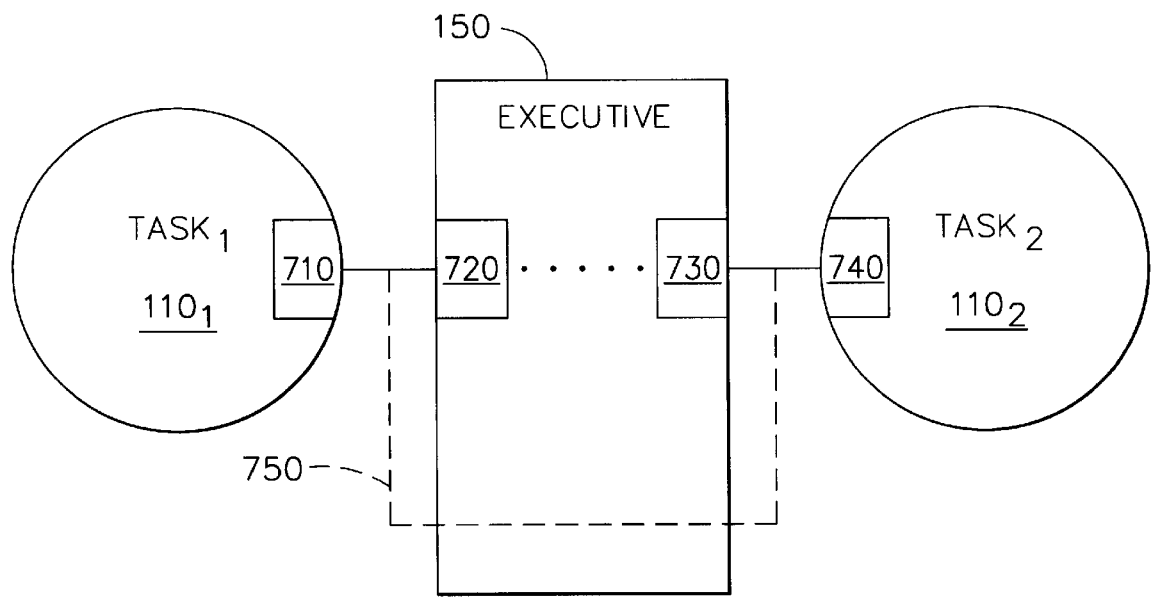
FIG. 7 is a schematic illustrating executive buffers in accordance with an embodiment of the invention.

Message passing is implemented by assignments between task buffer variables. In many cases an executive buffer variable may be allocated and used within the executive task 150, e.g., connections between non-harmonic or aperiodic tasks. In general, movement of message data is implemented as an assignment from a sender's buffer variable to an executive buffer variable followed by an assignment from the executive buffer variable to the receiver's buffer variable. For example, in FIG. 7, sender task 1101 passes its message value from an output buffer 710 to a shadow output buffer 720, an executive buffer. Shadow output buffer 720 in turn passes the message value to shadow input buffer 730, another executive buffer. Shadow input buffer 730 passes the message value to an input buffer 740 of receiver task 110$_2$. The two assignments, i.e., from sender to executive and executive to receiver, may occur at different scheduling points, e.g., the first at the deadline of a sender periodic task 110$_1$ and the second at the dispatch of a receiver periodic task 110$_2$. In one embodiment, the intermediate assignment of a message value to an executive buffer variable could be optimized away for connections between harmonic periodic tasks whose deadlines equal their periods, such that sender task 110$_1$ passes its message value directly to receiver task 110$_2$, as shown with dashed line 750. In this case, the executive buffers are eliminated. In another embodiment, the shadow output buffer and the shadow input buffer are the same executive buffer, for convenience termed a shadow input buffer.

The dispatcher task 610 performs single sample delay message passing between periodic tasks and performs periodic task dispatching. The dispatcher task 610 is typically implemented as the handler of a periodic hardware clock interrupt that occurs nearly simultaneously on all processors. The interrupt rate should be selected so that every dispatch and deadline is an integer multiple of the interrupt period, e.g., the greatest common divisor of the periods and deadlines that appear in the system specification.

At each interrupt, a cycle counter is incremented by 1 (modulo some large value that is a common multiple of all periods). The periodic actions that are to occur at each interrupt are determined by whether or not the cycle counter is evenly divisible by the periodicity of an action.

Figure 8:
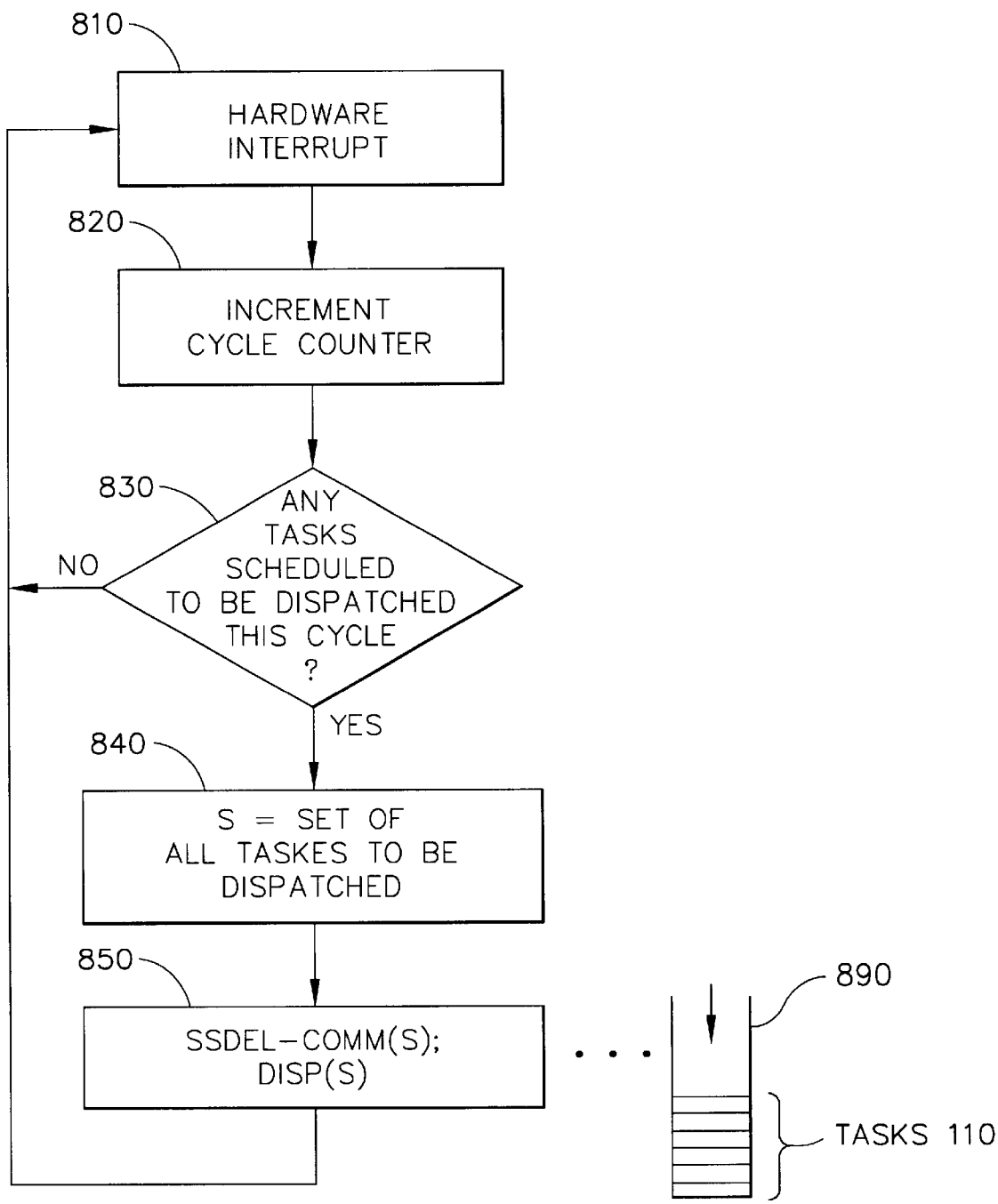
FIG. 8 is a process flowchart of a dispatcher task in accordance with an embodiment of the invention.

In one embodiment, a process flow of dispatcher task 610 can be described with reference to FIG. 8. FIG. 8 is a process flowchart having action boxes 810, 820, 840 and 850, as well as decision box 830. In action box 810, dispatcher task 610 is made ready to run at the periodic interrupt, such as a hardware clock interrupt. Upon receiving the periodic interrupt, the cycle counter is incremented in action box 820. Decision box 830 determines if any tasks scheduled are to be dispatched this cycle, i.e., where the cycle evenly divides the quantity of the task period divided by the periodic interrupt. If tasks are to be dispatched in decision box 830, action box 840 determines the set (S) of all tasks to be dispatched. Buffer-to-buffer message assignments are made in action box 850 for those periodic tasks meeting the criteria of decision box 830, and those tasks are dispatched. Control is then returned to the tasks interrupted by the periodic interrupt. Dispatch of the periodic tasks can be visualized as adding the task to a ready queue 890. With reference to FIG. 8, the following example is provided:

--- let task 1 ($\tau_1$) have period $T_1$ = 10 ms;
let task 2 ($\tau_2$) have period $T_2$ = 20 ms;
let task 3 ($\tau_3$) have period $T_3$ = 40 ms; and
let hardware global clock periodic interrupt = 10 ms
initialize cycle = 0
case cycle mod 4 is
    when 0 ⇒ ssdel_comm($\tau_1$, $\tau_2$, $\tau_3$,); disp($\tau_1$, $\tau_2$, $\tau_3$,)
    when 1 ⇒ ssdel_comm($\tau_1$); disp($\tau_1$)
    when 2 ⇒ ssdel_comm($\tau_1$, $\tau_2$); disp($\tau_1$, $\tau_1$, $\tau_2$)
    when 3 ⇒ ssdel_comm($\tau_1$); disp($\tau_1$)
end case
where:
    ssdel_comm($\tau_i$) means copy all $\tau_i$ output buffers to executive input buffers and copy executive output buffers to all $\tau_i$ input buffers; and
    disp($\tau_i$) means dispatch task i.

---

The event handler 620 is executed whenever external interrupts or internal software-generated events occur. Message values to be received at the dispatch of aperiodic tasks are assigned to their input buffer variables and the tasks are dispatched.

Figure 9:
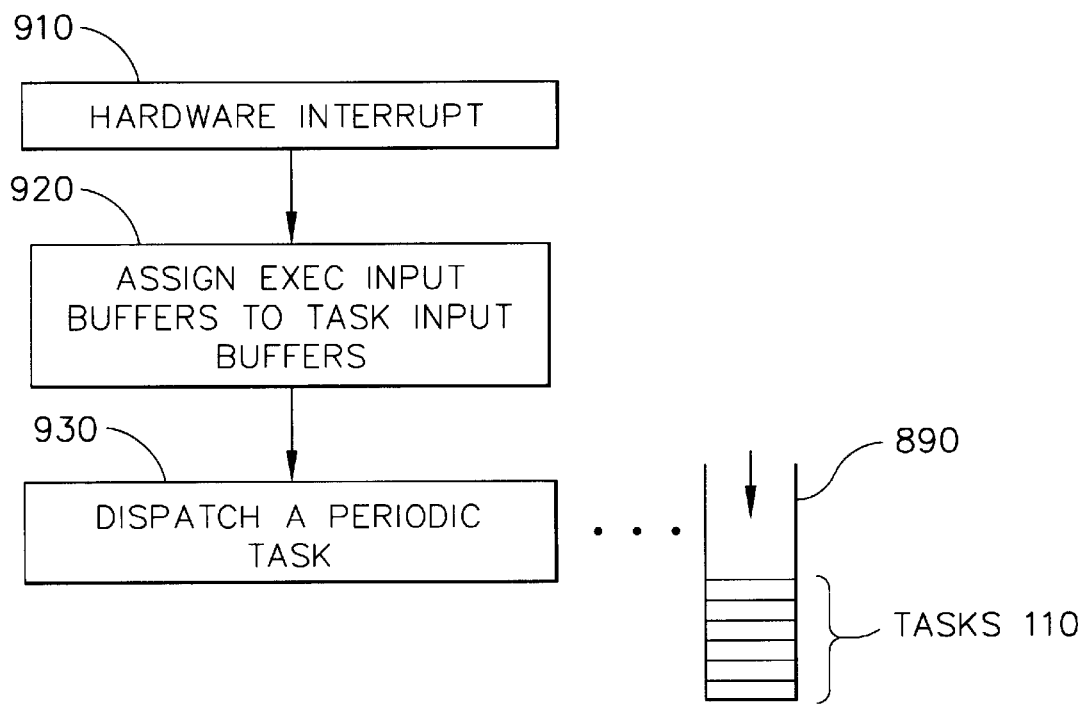
FIG. 9 is a process flowchart of an event handler in accordance with an embodiment of the invention.

FIG. 9 is a process flowchart of one embodiment of event handler 620. FIG. 9 includes actions boxes 910, 920 and 930. In action box 910, event handler 620 is executed in response to a software-generated event or external interrupt. Upon receiving the interrupt in action box 910, event handler 620 assigns message values to their task input buffers in action box 920. The aperiodic task or tasks associated with the interrupt in 910 are dispatched in action box 930. Control is then returned to the highest priority ready task. As with dispatch task 610, dispatching an aperiodic task includes adding the aperiodic task to the ready queue 890.

The service component 630 is executed when a task instance completes. The completing task is removed from the ready queue 890. Output values produced by the completing task are assigned to corresponding executive or receiver task buffer variables according to rules we present below. These assignments are conditional, depending on information recorded at the dispatch of every task that may receive undelayed messages. At each dispatch of a periodic task that may receive undelayed input from another periodic task, the cycle at which that task is dispatched is recorded. At the dispatch of each aperiodic task that may receive undelayed input from another task, the scheduling state of each sender task (awaiting dispatch, or dispatched but not yet completed) is recorded.

Figure 10:
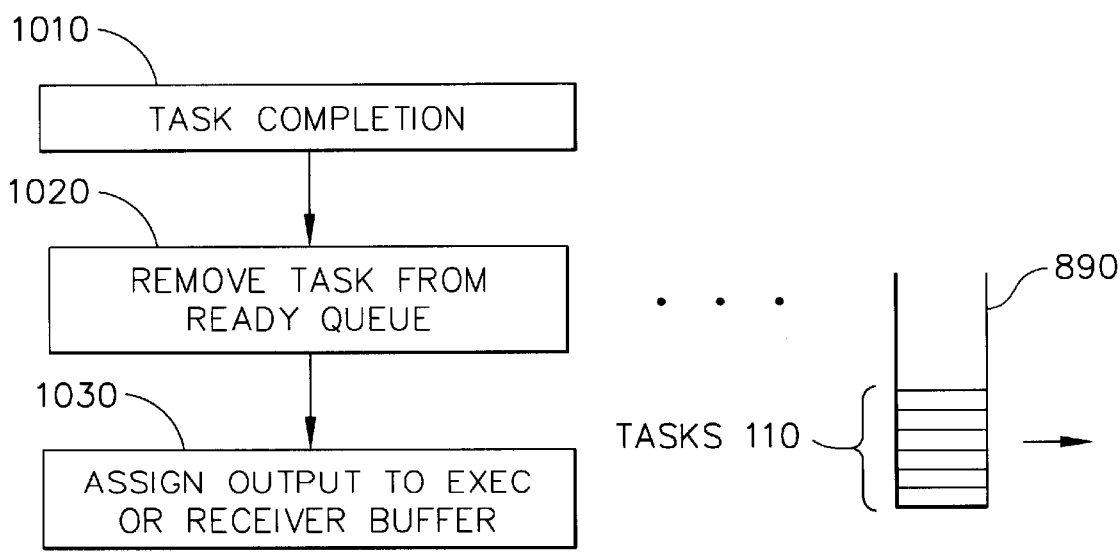
FIG. 10 is a process flowchart of a service component in accordance with an embodiment of the invention.

FIG. 10 is a process flowchart of one embodiment of service component 630. FIG. 10 includes actions boxes 1010, 1020 and 1030. In action box 1010, service component 630 is executed when a task completes. Upon completion of a task or tasks resulting in action box 1010, service component 630 removes the completing task or tasks from ready queue 890. Output from the completing task or tasks is assigned to an executive or receiver buffer in action box 1030. Control then goes to the highest priority task in the ready queue. Assignment of output in action box 1030 can be further described with reference to Table 1.

TABLE 1

Message Passing Timing

| Connection Type | Description |
|---|---|
| PR.in <- PS.out | Copy PS.out to PR.in.buffer at time $C_{S(n)}$. At time $D_{R(n)} = D_{S(n)}$, copy PR.in.buffer to port PR.in |
| DR.in <- PS.out | At time $L_{S(n)}$ copy PS.out to DR.in. |
| AR.in <- PS.out | At time $L_{S(n)}$ copy PS.out to AR.in.buffer. At time $D_{R(n)}$, copy AR.in buffer to AR.in. |
| PR.in <- DS.out | The device writes to DS.out. At time $D_{R(n)}$, DS.out is copied to port PR.in. |
| PR.in <- AS.out | At time $C_{S(n)}$ copy AS.out to PR.in.buffer. At time $D_{R(n)}$ copy PR.in.buffer to port PR.in. |
| AR.in <- AS.out | At time $C_{S(n)}$ copy AS.out to AR.in.buffer. At time $D_{R(n)}$ copy PR.in.buffer to port AR.in. |
| DR.in <- AS.out | At time $C_{S(n)}$ copy AS.out to the device's input port. |
| AR.in <- DS.out | The device writes to AR.in.buffer. At time $D_{R(n)}$, AR.in.buffer is copied to port AR.in. |
| PR.in <<- PS.out | If $D_{S(I)} = D_{R(I)}$, PS.out is copied to PR.in.buffer at time $C_{S(n)}$. At time $S_{R(n)}$, PR.in.buffer is input to port PR.in. |
| DR.in <<- PS.out | At time $C_{S(n)}$, PS.out is copied to port DR.in. |
| AR.in <<- PS.out | At time $C_{S(n)}$, PS.out is copied to AR.in.buffer. At time $S_{R(n)}$, AR.in.buffer is copied to AR.in. |
| PR.in <<- DS.out | The device writes to PR.in.buffer. At time $S_{R(n)}$, PR.in.buffer is copied to port PR.in. |
| PR.in <<- AS.out | At time $C_{S(n)}$, AS.out is copied to PR.in.buffer. At time $S_{R(n)}$, PR.in.buffer is copied to PR.in. |
| AR.in <<- AS.out | At time $C_{S(n)}$, AS.out is coped to AR.in.buffer. At time $S_{R(n)}$, AR.in.buffer is copied to AR.in. |

TABLE 1-continued

Message Passing Timing

| Connection Type | Description |
| --- | --- |
| DR.in <<- AS.out | At time $C_{S(n)}$, AS.out is copied to port DR.in. |
| AR.in <<- DS.out | At time $S_{R(n)}$, AR.in is assigned the current value of DS.out. | where: <<- = Undelayed Message Passing
<- = Single Sample Delayed Message Passing
XR.in = Input buffer for task X, where X = P (periodic), A (aperiodic) or D (device)
XR.in.buffer = Shadow Input buffer for task X, where X = P, A or D
XS.out = Output buffer for task X, where X = P, A or D
PR = Periodic Receiver
PS = Periodic Sender
AR = Aperiodic Receiver
AS = Aperiodic Sender
DR = Device Receiver
DS = Device Sender
$D_{S(n)}$ = The next dispatch of the sender task
$D_{S(l)}$ = The last dispatch of the sender task
$D_{R(n)}$ = The next dispatch of the receiver task
$D_{R(l)}$ = The last dispatch of the receiver task
$S_{R(n)}$ = The next start time of the receiver task
$C_{S(n)}$ = The next completion time of the sender task
$L_{S(n)}$ = The next deadline of the sender task In one embodiment, a priority assignment algorithm assigns a higher priority to the sender of an undelayed message than to any of its downstream receivers. Downstream receivers include any task directly receiving the undelayed message, as well as all receiving tasks in an acyclic graph rooted at the sender of the undelayed message. This guarantees that any task whose buffers are written at the completion of another task, i.e., any task receiving undelayed values from another task, has remained preempted from the time of its dispatch to the time of the assignment and thus does not start until after the assignment.

Whenever possible, a task with high criticality but long period is transformed so that a deadline monotonic priority assignment can be used. In one embodiment, period transformation is a form of controlled time-slicing. The compute time of the transformed task is divided by some integer value to arrive at a time slice for that task. A dispatch of the transformed task is converted into a dispatch followed by a series of periodic resumptions. Each dispatch and resumption grants a time slice, and after exhausting each time slice a transformed task is suspended until its next resumption. The overall effect is to make a low rate task look like a high rate task with smaller compute time, and thus higher priority.

For period transformation of periodic tasks, the dispatches and resumptions are simply inserted into the proper cases of the dispatcher case statement ($Q_1$ is then constrained to be a multiple of all transformed periods). Period transformation of aperiodic tasks depends on the scheduling protocol used. Period transformation can be easily applied using the deferrable server protocol, since this protocol is essentially controlled time-slicing slaved to the dispatcher frequency. In one embodiment, period enforcement is approximated by defining the reenabling of a task as the next dispatcher task dispatch, and an analogous approximate period transformation might also be performed. Slack scheduling can also be adapted to take criticality into account.

The MetaH toolset generates data tables and code for the dispatcher task 610, event handler 620 and service component 630. It further generates and analyzes a real-time schedulability model of the task system 100.

The undelayed message connections and tasks are checked to make sure they contain no cycles. Task deadlines are then reduced as needed so that the deadline of every sender of an undelayed message is strictly less than the deadline of all its receivers. A subsequent deadline-monotonic priority assignment phase, which assigns higher priorities to shorter deadlines, assigns a higher priority to the sender of an undelayed message than to the receiver. This insures that the receiver remains preempted and does not start until after the sender completes whenever the conditions for undelayed transfer are satisfied.

In greater detail, the set of undelayed message connections is first checked for cycles. Task deadlines are then reduced as needed so that the deadline of every sender of an undelayed message is strictly less than the deadline of all its receivers. A subsequent deadline-monotonic priority assignment phase, which assigns higher priorities to shorter deadlines, will assign a higher priority to the sender of an undelayed message than to its receivers. This insures that the receiver remains preempted and does not start until after the sender completes whenever the conditions for undelayed transfer are satisfied.

More formally, the set of all undelayed messages is represented as a reachability matrix R with $R(i,j)=1$ if $\tau_i \text{->>} \tau_j$ and zero otherwise. Construct $R^k(i,j)=1$ if there is an undelayed connection path from $\tau_i$ to $\tau_j$ of length exactly k, and zero otherwise. Cycles, which are not permitted, exist if for any $1 \leq i, k \leq n_u$, $R^k(i,j)=1$, where $n_u$ is the number of tasks with undelayed connections.

Next construct a distance matrix D from the set $\{R^k\}$ by $D(i,j)^- \max\{k|R^k(i,j)=1\}$. In words, $D(i,j)$ is the maximum length undelayed message connection path from $\tau_i$ to $\tau_j$. There may be multiple paths, in which case set $D(i,j)=0$ (rather than $\infty$). The deadline of each task $\tau$ is then adjusted to be the minimum of its user-specific deadline and the deadlines of all tasks that can be reached from $\tau$. To insure distinct deadlines and priority assignments, these deadlines are then decreased by $m\epsilon$, where m is the maximum connection depth between an undelayed message sender and all of the leafs in the undelayed connection directed acyclic graph (DAG) rooted at that sender, and $\epsilon$ is a time quantum preferably several orders of magnitude smaller than the number of tasks times the deadline quantum, i.e., the dispatcher task rate. For example, $\epsilon$ may be 1 nanosecond with the expectation that deadlines will be multiples of a dispatcher task period measured in milliseconds. The term internal deadlines is defined to refer to these adjusted deadlines. In mathematical notation, Let $I(i)=\{k: D(i,k)>0\}$. $I(i)$ is the index set of all tasks that $\tau_i$ can reach via an undelayed message chain. Then for each $i$, $\tau'_i$deadline= $\min_{k \in I(i)}\{\tau'_i\text{deadline}, \tau'_k\text{deadline}^-_D(i,k)\cdot\epsilon\}$.

Conflicts can arise between the user-specified criticalities for two tasks and the priority assignments implied by undelayed connections and their corresponding internal deadlines. For example, if there is an undelayed connection from A to B then A must have a higher priority than B to properly implement the precedence constraint, but B could have a higher user-specified criticality than A. A conflict test is given by $\tau'_i$criticality$>\tau'_j$criticality and $j \in I(i)$. Such conflicts are allowed provided that compute time limits (and, for aperiodic tasks, period enforcement) are specified for the sender, otherwise it is an error. Internal deadlines (and priorities) are assigned in accordance with undelayed connection precedence constraints rather than in accordance with user-specified criticality attributes when there is such a conflict. User-specified criticality values are adjusted upward as needed to remove acceptable conflicts. The term internal criticalities is defined to refer to these adjusted criticality values.

As an example, let $\tau_u$ be a task that sends an undelayed message. Let $R_u$ be the set of all tasks that eventually receive input from $\tau_u$, directly or through intermediate tasks via a sequence of undelayed messages. $R_u$ contains the nodes of the DAG of receiver tasks rooted at $\tau_u$, and is easily constructed using a transitive closure of all tasks and their message connections. Since $\tau_u$ must complete before any task in $R_u$ can begin, the internal criticality of $\tau_u$ is adjusted to be the minimum of its user-specified criticality and the internal criticalities of tasks in $R_u$.

The list of tasks that send or receive undelayed messages is then sorted by ascending internal deadlines. If multiple tasks have equal deadlines, then that sublist is sorted by ascending criticality. The result is a sorted list with internal deadline as primary key and internal criticality as secondary key, where internal deadlines and internal criticalities are both consistent with each other and ascending.

The list of remaining tasks (those that neither send nor receive undelayed messages) is now merged with this list in sorted order, using user-specified deadline as the primary key and user-specified criticality as secondary key. Inconsistencies among criticality rankings and deadline rankings is permissible in this list. These inconsistencies will be removed later using period transformation. Internal criticalities and internal deadlines are set to the user-specified criticalities and user-specified deadlines, respectively.

The merged list of tasks is sorted using internal deadline as the primary key and internal criticality as the secondary key. The next step is to transform the periods and deadlines of the tasks so that both criticalities and deadlines are in monotonic order. That is, all tasks having a first criticality have deadlines that are less than any task having a lower criticality.

Figure 11:
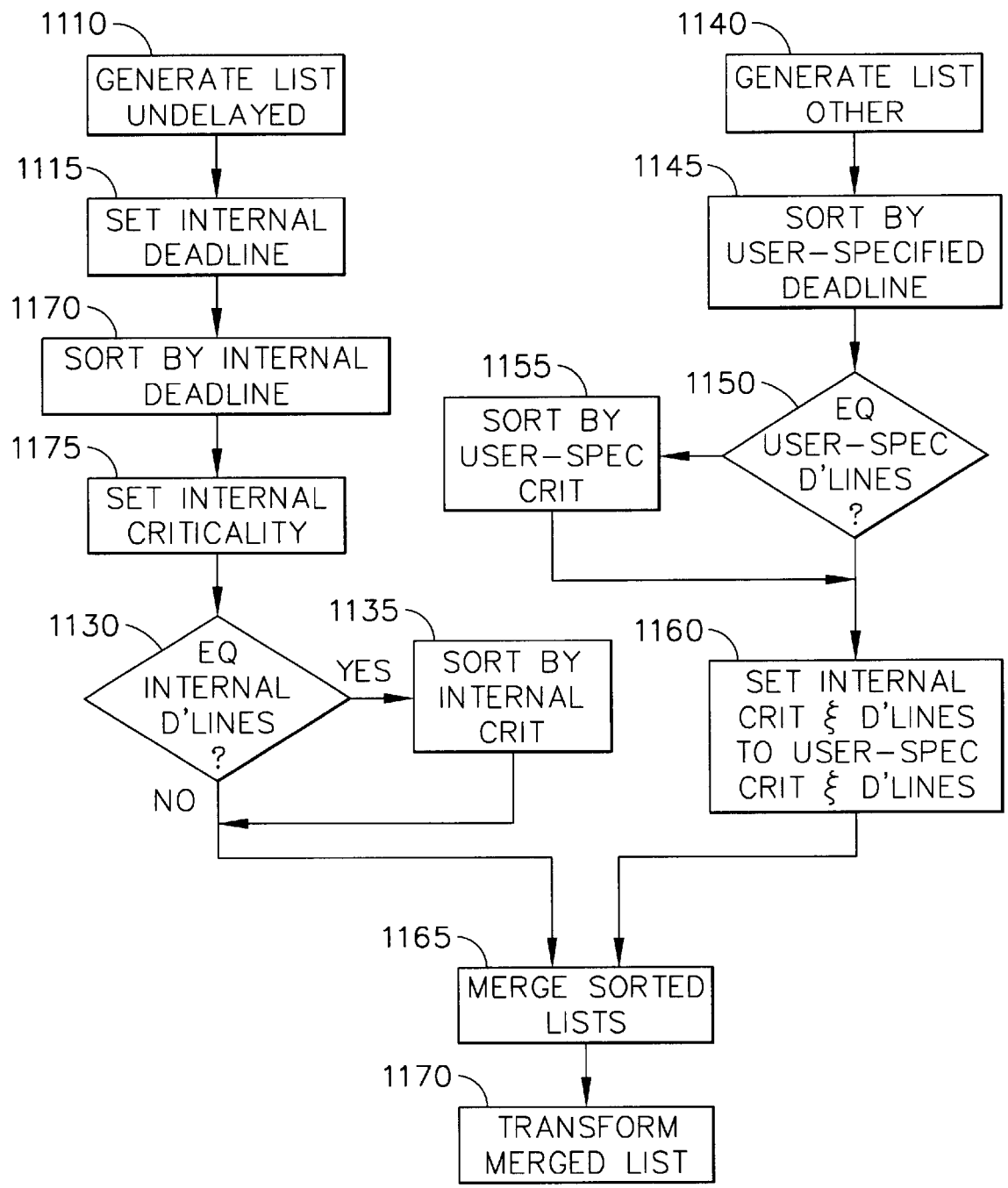
FIG. 11 is a process flowchart of task list generation in accordance with an embodiment of the invention.

FIG. 11 is a process flowchart of one embodiment of the foregoing task list generation. In FIG. 11, the list of tasks that send or receive undelayed messages and the list of remaining tasks are generated in parallel. However, there is no requirement for such parallel implementation.

FIG. 11 includes action boxes 110, 1115, 1120, 1125, 1135, 1140, 1145, 1155, 1160, 1165 and 1170, as well as decision boxes 1130 and 1150. Generation of the list of tasks that send or receive undelayed messages for each processor begins at action box 1110. Internal deadlines are set in action box 1115 such that the deadline of every sender task is strictly less than the deadline of all its receivers. The list is then sorted by internal deadline in action box 1115. Internal criticalities are set in action box 1125 to remove conflicts. Decision box 1130 determines if multiple tasks in the sorted list have equal internal deadlines. If yes, the portion or portions of the list having equal deadlines are sorted by internal criticality in action box 1135. If there are no portions of the list having equal internal deadlines in decision box 1130, or following sorting by internal criticality in action box 1135, control is transferred to action box 1165.

Generation of the list of tasks that do not send nor receive undelayed messages for each processor begins at action box 1140. The list generated in action box 1140 is sorted by user-specified deadline in action box 1145. Decision box 1150 determines if multiple tasks in the sorted list have equal user-specified deadlines. If yes, the portion or portions of the list having equal user-specified deadlines are sorted by user-specified criticality in action box 1155. If there are no portions of the list having equal user-specified deadlines in decision box 1150, or following sorting by user-specified criticality in action box 1155, control is transferred to action box 1160 where internal criticalities and deadlines are set to the user-specified criticalities and deadlines, respectively.

Action box 1165 merges the sorted list of tasks that send or receive undelayed messages with the sorted list of tasks that do not send nor receive undelayed messages. The merged list is sorted with internal deadline as the primary key and internal criticality as the secondary key. The merged list is then subjected to transformation in action box 1170 to generate the priority sorted list.

A task is transformed by dividing its period and compute time by some positive integer, thus converting it, in this example via controlled run-time time slicing, into a task with smaller period and deadline and consequently higher priority.

The transformation algorithm operates on tasks one at a time, starting with the task having least deadline. The list of tasks can be viewed as a concatenation of sublists HELpU where p is the task currently being transformed, H is the sublist of tasks having criticality higher than that of p, E is the sublist of tasks having criticality equal to that of p, L is the sublist of tasks having criticality less than that of p, and U is the untransformed portion of the list. The goal is to find an integer divisor of the period (and compute time) of p, i.e., a transform factor, that allows the list to be rewritten as $HE_1pE_2LU$ where the tasks in $E_1$ and $E_2$ have criticalities equal to that of p, the tasks in $E_1$ have no deadlines greater than that of p, and the tasks in $E_2$ have no deadlines less than that of p.

Several factors complicate the solution to this problem. It is possible to construct examples having no feasible integer solution, where transforming p by transform factor i yields a transformed period too large, but transforming p by transform factor i+1 yields a transformed period too small. For example, consider the criticality ordering A>B>C with the period of A and C equal to 2 but the period of B equal to 3. Using the transform factor of 1 yields a transformed period too large, while using the transform factor of 2 yields a transformed period too small.

A transformed task may need to complete by a preperiod deadline. Thus, transformation of the deadline analogous to the transformation of period may be appropriate.

Transformation introduces context swap overheads. In one embodiment, these context swap overheads are minimized. Furthermore, transformed periods and deadlines are preferably multiples of the clock interrupt period. Finally, the sender of an undelayed message cannot be transformed, as this might create intervals in which the receiver could start before the sender had completed. Accordingly, undelayed message senders have their deadlines calculated prior to any period transformations.

Figure 12:
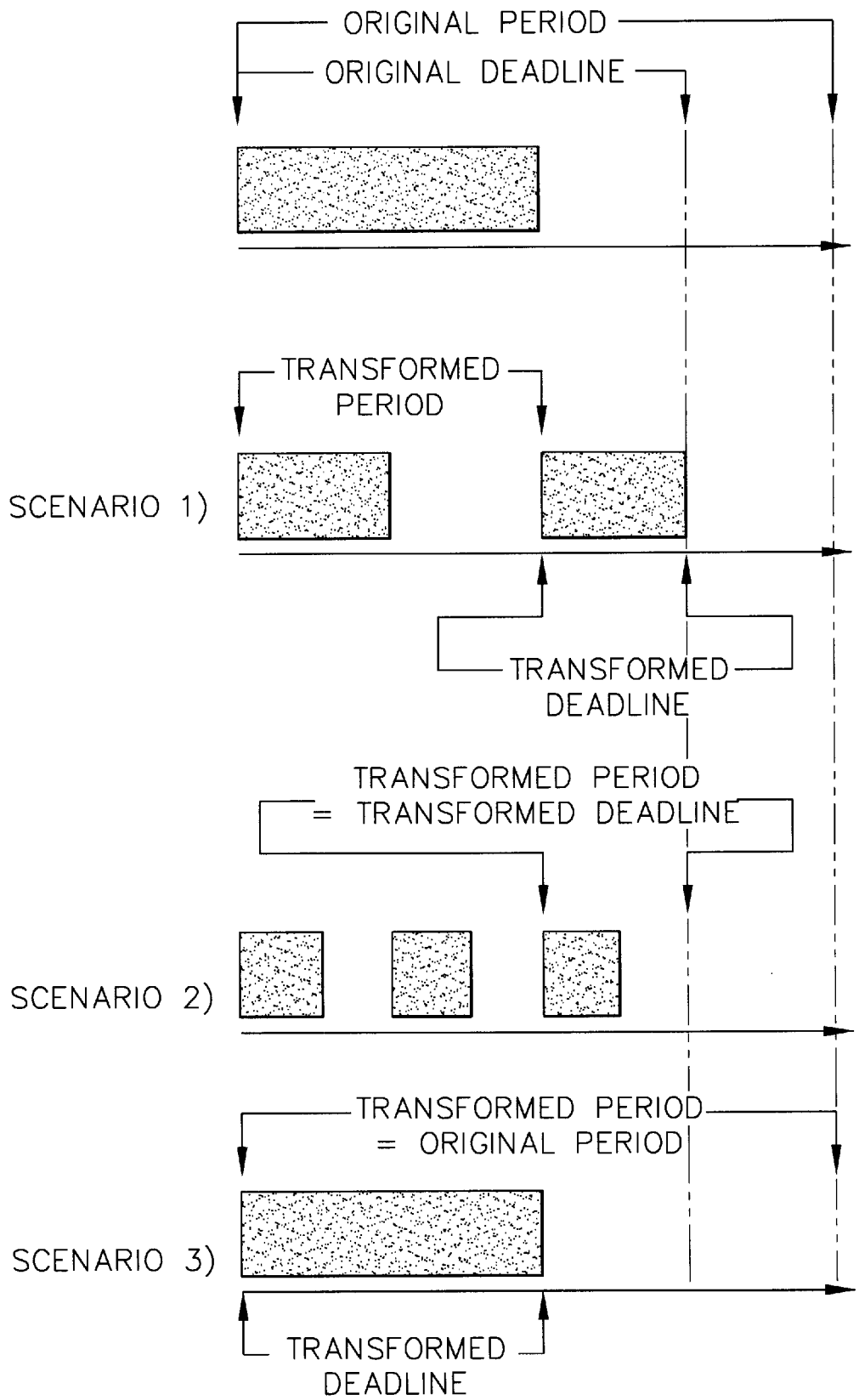
FIG. 12 is an illustration of example transformation scenarios for use in accordance with embodiments of the invention.

FIG. 12 shows three scenarios for transforming a task so that it will receive its stated amount of compute time by its stated deadline. The first portion of FIG. 12 shows the original task period and deadline. Scenario 1 of FIG. 12 is to transform both the period and the deadline, where the transformed deadline is a preperiod deadline with respect to the transformed period and is selected so that the transformed deadline of the final resume occurs at the original deadline. This scenario is preferred when the transformed deadline is a substantial fraction of the transformed period. Scenario 2 transforms the task so its original deadline is a multiple of the transformed period. The transformed deadline equals the transformed period, and the transformed compute time is such that the task will complete after some number of transformed periods that is no greater than the original deadline. Scenario 2 is preferred over Scenario 1 when Scenario 1 would produce a transformed deadline that is a small fraction of the transformed period. Both scenarios are the same when the original deadline and original period are equal. Scenario 3 is to simply reduce the deadline as needed, i.e., just increase the priority as needed to satisfy the criticality requirement without transforming the scheduling of the task. Scenario 3 is utilized when transforming senders of undelayed messages and in cases where no integer transform factor is feasible.

In one embodiment, a search is performed over the range of feasible integer transform factors, i.e., those that would move task p into the sublist E. For each feasible transform factor, both Scenario 1 and Scenario 2 are evaluated. Scenario 3 may also be evaluated for all integer transform factors from 1 through the largest transform factor that does not put p ahead of E, which has the effect of evaluating combinations of Scenario 3 with Scenarios 1 and 2.

In one embodiment, a cost function is used to select one scenario over another, such that cost is minimized. In another embodiment, the cost function is the utilization required for context swaps, i.e., removal and replacement of the stack and registers, plus a factor that empirically accounts for the decrease in schedulability due to preperiod deadlines. In a further embodiment, the cost function is the transform factor (which may be 1) times:

$$\frac{S}{T_t} + \frac{T_t - D_t}{T_t}$$

where S is the context swap time, $T_t$ is the transformed period, and $D_t$ is the transformed deadline. In one embodiment, selection of a scenario is made to minimize the cost function.

Figure 13:
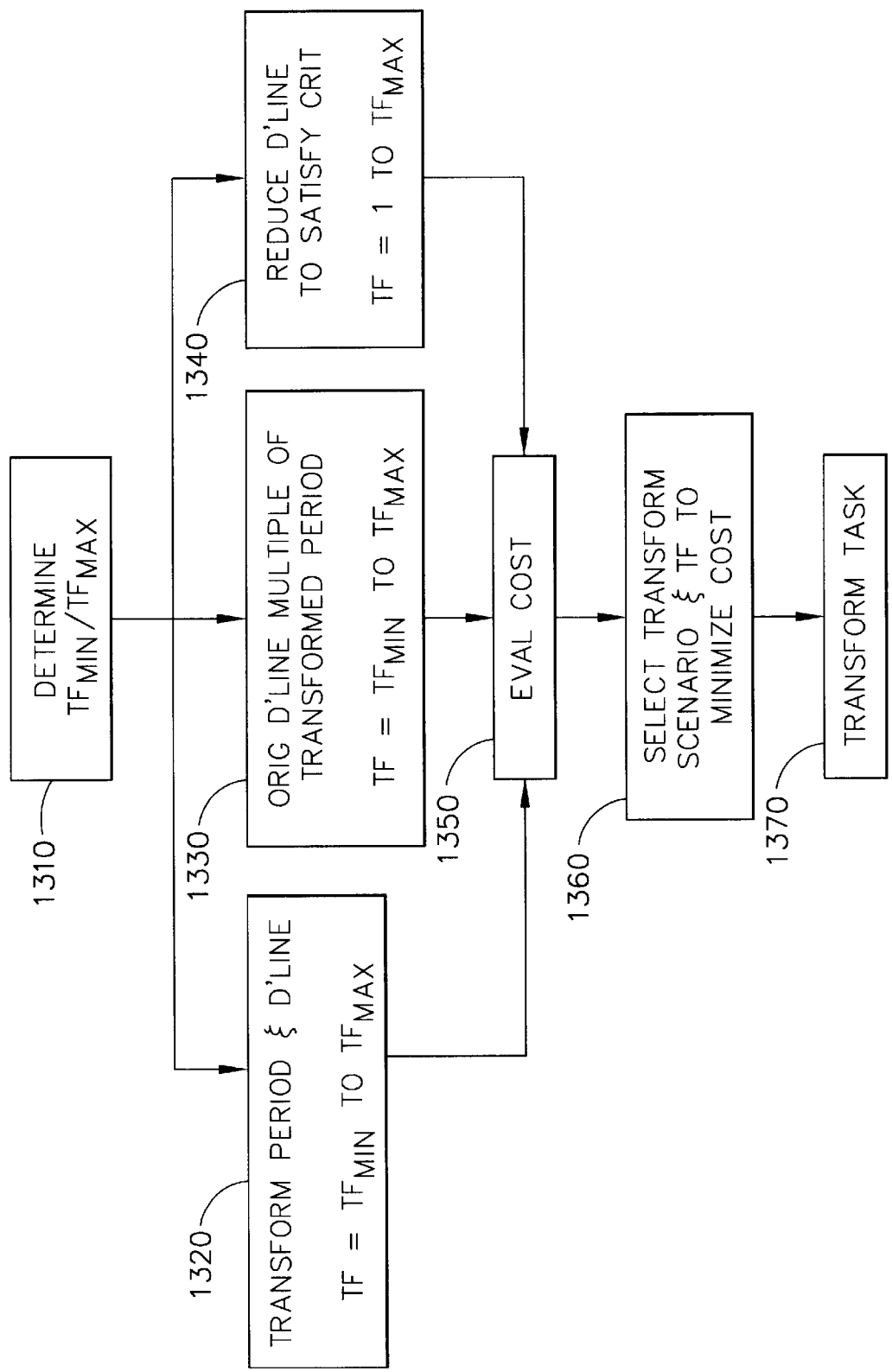
FIG. 13 is a process flowchart of task transformation in accordance with an embodiment of the invention.

FIG. 13 is a process flowchart of one embodiment of task transformation, performed for each task in the merged list of tasks. In action box 1310, feasible integer transform factors are determined. Feasible transform factors include the lowest integer divisor of the period of p that allows the sublist HELpU to be rewritten as $HE_1pE_2LU$ where the tasks in $E_1$ and $E_2$ have criticalities equal to that of p, the tasks in $E_1$ have no deadlines greater than that of p, and the tasks in $E_2$ have no deadlines less than that of p, i.e., minimum feasible transform factor or $TF_{min}$, the largest integer divisor of the period of p that allows the sublist HELpU to be rewritten as $HE_1pE_2LU$ where the tasks in $E_1$ and $E_2$ have criticalities equal to that of p, the tasks in $E_1$ have no deadlines greater than that of p, and the tasks in $E_2$ have no deadlines less than that of p, i.e., maximum feasible transform factor or $TF_{max}$. In action box 1320, the task has its period and deadline transformed in a first scenario for each transform factor from $TF_{min}$ to $TF_{max}$, where the transformed deadline is a preperiod deadline with respect to the transformed period and is selected so that the transformed deadline of the final resume occurs at the original deadline. In action box 1330, the task is transformed in a second scenario for each transform factor from $TF_{min}$ to $TF_{max}$ such that its original deadline is a multiple of the transformed period. The transformed deadline equals the transformed period, and the transformed compute time is such that the task will complete after some number of transformed periods that is no greater than the original deadline. In action box 1340, the deadline of the task is transformed in a third scenario, reducing the deadline to increase the priority as needed to satisfy the criticality requirement without transforming the scheduling of the task. After all scenarios are evaluated over their respective range of transform factors, cost is evaluated in action box 1350 for each transform factor of each scenario. In action box 1360, the scenario and transform factor having the lowest cost value is selected to transform the task. The task is transformed in action box 1370.

After all tasks have been transformed, priorities are assigned in the order in which tasks appear in the final list. The ordered priorities of the transformed tasks represents an assigned scheduling priority. The assigned scheduling priority is utilized by the executive for ordered execution of the tasks on a processor within the multitask system.

As one example, in an implementation of the invention using the MetaH toolset, the MetaH toolset generates a linear schedulability model, one in which each task may be described as a sequence of task components. Each task component may be shared by other tasks and may block other tasks. In general, actions that are performed by the executive task 150 on behalf of a particular task 110, such as message passing, are modeled as components of that task and blocking times for other tasks of higher priority. Compute times for generated executive components are produced by the MetaH tool using attributes of the target hardware, e.g., buffer assignment times are estimated by the linear function $A_1+A_2 * b$, where b is the number of bytes being assigned and $A_1, A_2$ are intercept and slope attributes defined in the MetaH processor or bus specification. The mapping between specification, implementation, and model is thus more detailed than a simple list of tasks and their parameters. Analysis is performed using an extension of an exact characterization algorithm that allows tasks to be decomposed into components and provides compute-time sensitivity analysis information.

The various embodiments of the invention will not always produce a user-specified deadline monotonic priority assignment. Many schedulability analysis methods well known to those skilled in the art work with any priority assignment without assumptions or special constraints on the relationship between priorities and deadlines, periods, or minimum interarrival rates and can be used with the approach of the embodiments.

The solution of the various embodiments remains valid for tasks that use real-time semaphores, providing the semaphore protocol does not allow the processor to execute at a priority lower than any task that is awaiting a semaphore. This condition is necessary to insure that preempted receivers of undelayed messages cannot start when a sender blocks on a semaphore. This is true of the ceiling priority and all the priority inheritance semaphore protocols.

The various embodiments of the invention further support dynamic reconfiguration, or mode changes. In one embodiment, mode changes are restricted to hyperperiod boundaries. Transition modes are introduced for each user-specified mode change, and the dispatcher may perform process starts and stops and slightly different patterns of message passing in a transition mode. MetaH hierarchical mode specifications makes it possible for modes to share subsets of tasks and connections in complex ways. The algorithms thus presented are performed for the union of all modes in a system, followed by a post-processing phase to reduce the number of priority levels required.

Selecting clock interrupt rates may be an issue in distributed real-time systems. Temporally deterministic message release times may be needed to assure hard end-to-end deadlines. Clock interrupt periods may be desired that not only divide the user-specified periods and deadlines, but also provide convenient transformed periods and convenient network message release times.

The various methods of the invention provide a model adapted to analyze the timing behavior of a task system, and in particular, modular mission-critical software systems, high-rate applications and microcontrollers. Use of such models permits off-line analysis and configuration to tailor an executive for each system, rather than relying on a generic executive, which allows a simpler, smaller and faster executive. Such models further assist the formulation of well-structured specifications for task systems, which may permit the creation of more structured and traceable code underlying the task system.

While the example embodiments describe multiprocessor task systems communicating on a single bus, the invention is not limited to single-bus systems. While it is preferred that multiple processors be connected by relatively high-speed, low-latency busses for efficient transfer of single sample delay messages, distributed systems may be utilized where scheduling approaches allow for a single sample delay message to be released with a specified deadline on the network, and where communication take place concurrently with processor execution.

Figure 14:
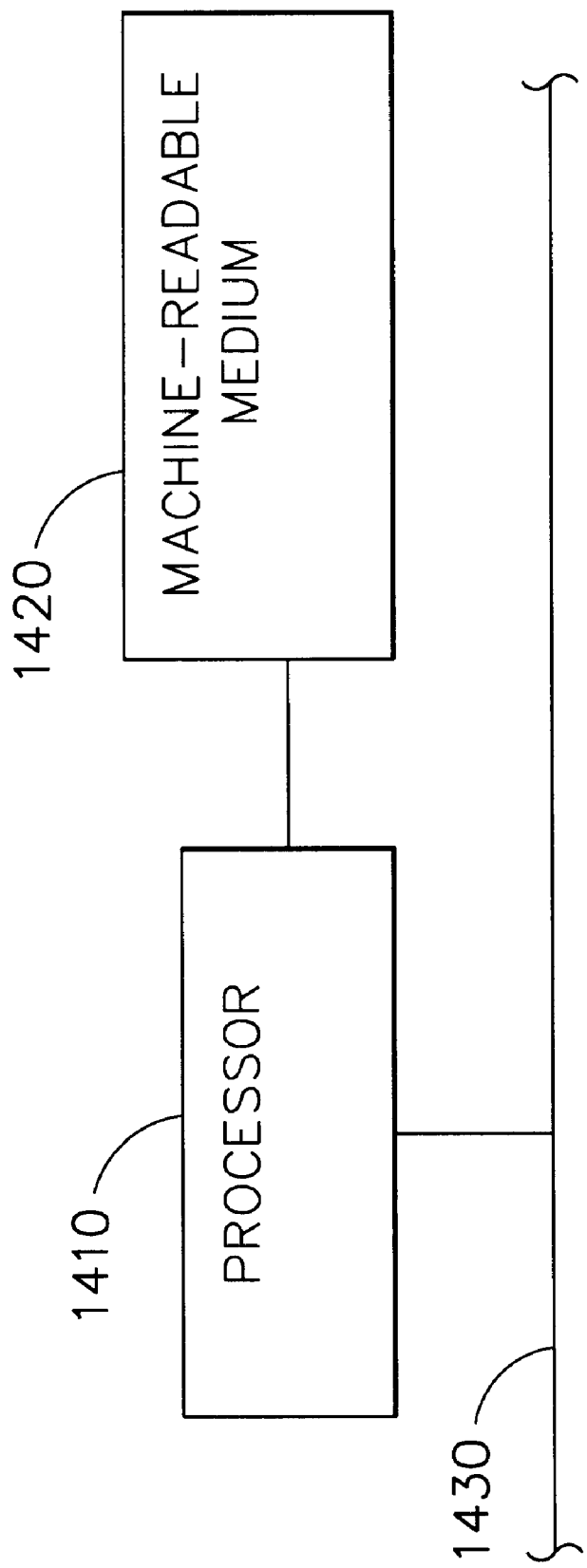
FIG. 14 is a block diagram of an electronic system in accordance with an embodiment of the invention.

Models produced using various embodiments of the invention can be used to define electronic systems to carry out the scheduling and message passing activities of the multitask systems. The electronic systems described make use of a variety of electronic equipment having processors utilizing instructions in machine-readable form to carry out the methods described herein. FIG. 14 depicts a block diagram of a processor 1410 coupled to a machine-readable medium 1420. Processor 1410 may be further coupled to bus 1430 for communication to other processors. Machine-readable medium 1420 may include fixed devices coupled to processor 1410, such as internal magnetic medium or programmable memory device. Machine-readable medium 1420 may further include removable devices coupled to processor 1410, such as removable magnetic medium or programming cartridge. Machine-readable medium 1420 contains instructions stored thereon, in machine-readable format, capable of causing processor 1410 to carry out the methods described herein.

Conclusion

Methods are disclosed useful in modeling real-time periodic and aperiodic task scheduling and message passing within multitask systems. Models produced using methods of the invention are adapted to analyze the timing behavior within such multitask systems. The methods utilize undelayed and single sample delayed message connections among software task objects and hardware objects. Task priorities are assigned inversely with period or deadline, so that tasks with shorter periods or deadlines have higher scheduling priorities. Periods of high-criticality tasks are decomposed into smaller pieces that are sequentially dispatched at higher rates where the initial assignment of priority is inconsistent with task criticality. System models define electronic systems and instructions for carrying out the scheduling and message passing of the multitask system.

Although specific embodiments have been illustrated and described herein, it will be appreciated by those of ordinary skill in the art that any arrangement which is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A method of generating an assigned scheduling priority of a plurality of tasks in a multitask system, comprising:

defining a first list of the plurality of tasks, wherein the first list of the plurality of tasks is sorted with a task deadline as a primary key and a task criticality as a secondary key;

transforming the task deadline of each of the plurality of tasks one at a time using a transformation scenario, beginning with the task having the least task deadline, thereby producing a transformed task deadline for each of the plurality of tasks;

defining a second list of the plurality of tasks, wherein the second list of the plurality of tasks is sorted with the transformed task deadline as the primary key, further wherein each transformed task deadline of a task having a first task criticality is less than any transformed task deadline of a task having a task criticality less than the first task criticality; and assigning scheduling priority in an order of the second list of the plurality of tasks, thereby producing the assigned scheduling priority.

2. The method of claim 1, wherein the transformed task deadline of at least one of the plurality of tasks equals the task deadline of that at least one of the plurality of tasks.

3. The method of claim 1, wherein the transformation scenario is selected from the group consisting of:

transforming both a task period and the task deadline of a task by dividing the task period by a transformation factor, thereby producing the transformed task deadline and a transformed task period, wherein the transformed task deadline is a preperiod deadline with respect to the transformed task period, and wherein the transformed task deadline of a final resume of the task occurs at the original task deadline;

transforming both the task period and the task deadline of the task by dividing the task period by a transformation factor, thereby producing the transformed task deadline and the transformed task period, wherein the original task deadline of the task is a multiple of the transformed period of the task and wherein the transformed task deadline equals the transformed task period; and transforming the task deadline of the task by dividing the task deadline by a transformation factor, thereby producing the transformed task deadline, wherein the transformed task deadline of the task is less than any transformed task deadline of other previously-transformed tasks having lower task criticality.

4. The method of claim 3, wherein the transformation scenario is evaluated at a plurality of transformation factors.

5. The method of claim 3, wherein transforming the task deadline further comprises evaluating a cost function to select the transformation scenario.

6. The method of claim 5, wherein the cost function is the transformation factor times the quantity:

$$\frac{S}{T_t} + \frac{T_t - D_t}{T_t}$$

where:
S is a context swap time
$T_t$ is the transformed task period
$D_t$ is the transformed task deadline.

7. The method of claim 1, wherein transforming the task deadline further comprises evaluating a cost function to select the transformation scenario from a plurality of possible transformation scenarios.

8. The method of claim 1, wherein transforming the task deadline further comprises evaluating the transformation scenario using at least two transformation factors and evaluating a cost function to select one of the at least two transformation factors for the transformation scenario.

9. The method of claim 1, wherein defining a first list of the plurality of tasks further comprises:
defining a first sublist of at least one task of the plurality of tasks involved in sending or relying on undelayed messages, wherein the first sublist is sorted with an internal task deadline as a primary key and an internal task criticality as a secondary key;
defining a second sublist of remaining tasks of the plurality of tasks, wherein the second sublist is sorted with a user-specified task deadline as a primary key and a user-specified task criticality as a secondary key; and
merging the first sublist and the second sublist, thereby producing the first list of the plurality of tasks.

10. The method of claim 1, wherein the multitask system is a flight control system.

11. A machine-readable medium having instruction stored thereon capable of causing a processor to carry out a method, the method comprising:
defining a first list of a plurality of tasks, wherein the first list of the plurality of tasks is sorted with a task deadline as a primary key and a task criticality as a secondary key;
transforming the task deadline of each of the plurality of tasks one at a time using a transformation scenario, beginning with the task having the least task deadline, thereby producing a transformed task deadline for each of the plurality of tasks;
defining a second list of the plurality of tasks, wherein the second list of the plurality of tasks is sorted with the transformed task deadline as the primary key, further wherein each transformed task deadline of a task having a first task criticality is less than any transformed task deadline of a task having a task criticality less than the first task criticality; and
assigning scheduling priority in an order of the second list of the plurality of tasks, thereby producing an assigned scheduling priority.

12. A machine-readable medium having instruction stored thereon capable of causing a processor to carry out a method, the method comprising:
defining a first list of a plurality of tasks, wherein the first list of the plurality of tasks is sorted with a task deadline as a primary key and a task criticality as a secondary key;
transforming the task deadline of each of the plurality of tasks one at a time using a transformation scenario, beginning with the task having the least task deadline, thereby producing a transformed task deadline for each of the plurality of tasks, wherein the transformation scenario is selected from the group consisting of:
transforming both a task period and the task deadline of a task by dividing the task period by a transformation factor, thereby producing the transformed task deadline and a transformed task period, wherein the transformed task deadline is a preperiod deadline with respect to the transformed task period, and wherein the transformed task deadline of a final resume of the task occurs at the original task deadline;
transforming both the task period and the task deadline of the task by dividing the task period by a transformation factor, thereby producing the transformed task deadline and the transformed task period, wherein the original task deadline of the task is a multiple of the transformed period of the task and wherein the transformed task deadline equals the transformed task period; and
transforming the task deadline of the task by dividing the task deadline by a transformation factor, thereby producing the transformed task deadline, wherein the transformed task deadline of the task is less than any transformed task deadline of other previously-transformed tasks having lower task criticality; and
defining a second list of the plurality of tasks, wherein the second list of the plurality of tasks is sorted with the transformed task deadline as the primary key, further wherein each transformed task deadline of a task having a first task criticality is less than any transformed task deadline of a task having a task criticality less than the first task criticality; and
assigning scheduling priority in an order of the second list of the plurality of tasks, thereby producing an assigned scheduling priority.

13. A method of operating a multitask system having a processor, comprising:
communicating among a plurality of tasks having a priority and a criticality, wherein each of the plurality of tasks has a communication function selected from the group consisting of sender and receiver, and wherein each communication function is adapted for message types selected from the group consisting of undelayed messages and single sample delay messages;
assigning a higher priority to any sender task sending undelayed messages than any downstream receiver task;
assigning priority to other sender tasks such that each task of the plurality of tasks having a first criticality further has a priority greater than any of the plurality of tasks having a criticality lower than the first criticality; and
executing each of the plurality of tasks on the processor according to their assigned priorities.

14. The method of claim 13, wherein the multitask system is a flight control system.

15. A machine-readable medium having instruction stored thereon capable of causing a processor to carry out a method, the method comprising:
communicating among a plurality of tasks having a priority and a criticality, wherein each of the plurality of tasks has a communication function selected from the group consisting of sender and receiver, and wherein each communication function is adapted for message types selected from the group consisting of undelayed messages and single sample delay messages;

assigning a higher priority to any sender task sending undelayed messages than any downstream receiver task;

assigning priority to other sender tasks such that each task of the plurality of tasks having a first criticality further has a priority greater than any of the plurality of tasks having a criticality lower than the first criticality; and executing each of the plurality of tasks on the processor according to their assigned priorities.

* * * * *